(12) United States Patent
Shimokawa et al.

(10) Patent No.: US 7,562,372 B2
(45) Date of Patent: Jul. 14, 2009

(54) OPTICAL PICKUP

(75) Inventors: Satoshi Shimokawa, Kawasaki (JP);
Kouichi Tezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 11/363,883

(22) Filed: Feb. 28, 2006

(65) Prior Publication Data

US 2006/0225087 A1 Oct. 5, 2006

(30) Foreign Application Priority Data

Mar. 29, 2005 (JP) ............................. 2005-093512
Dec. 1, 2005 (JP) ............................. 2005-347477

(51) Int. Cl.
*G11B 7/085* (2006.01)
(52) U.S. Cl. ................................... 720/683
(58) Field of Classification Search ............ 720/683, 720/684, 681, 649, 685, 682
See application file for complete search history.

(56) References Cited

U.S. PATENT DOCUMENTS

| | | | |
|---|---|---|---|
| 7,054,236 B2 | 5/2006 | Kawano | |
| 7,107,602 B2 * | 9/2006 | Kimura et al. | 720/683 |
| 7,181,751 B2 * | 2/2007 | Kimura et al. | 720/683 |
| 7,313,799 B2 * | 12/2007 | Kimura et al. | 720/683 |
| 2003/0103441 A1 | 6/2003 | Kim et al. | |
| 2004/0103420 A1 * | 5/2004 | Kimura et al. | 720/683 |
| 2007/0006246 A1 * | 1/2007 | Kimura et al. | 720/683 |

FOREIGN PATENT DOCUMENTS

| | | |
|---|---|---|
| CN | 1428771 A | 7/2003 |
| CN | 1581315 A | 2/2005 |
| JP | 2003-281758 | 10/2003 |
| JP | A 2005-050414 | 2/2005 |

* cited by examiner

*Primary Examiner*—Allen T Cao
(74) *Attorney, Agent, or Firm*—Fujitsu Patent Center

(57) ABSTRACT

An optical pickup is provided for driving objective lenses in focusing and radial directions. The pickup includes a movable member, and objective lenses at the center portion of the movable member. The pickup also includes coil blocks provided at two side portions of the movable member, and pairs of magnets flanking the coil blocks in a tangential direction perpendicular to the focusing and radial directions. Support members are attached to the side portions of the movable member, permitting the movable member to move in the focusing direction and the radial direction. Each coil block includes focusing and tracking coils for driving the movable member in the focusing direction and the radial direction. The center portion of the movable member, below which a reflector is arranged, is thinner than the side portions of the movable member.

10 Claims, 12 Drawing Sheets

OPTICAL PICKUP

BACKGROUND OF THE INVENTION

1. Field of the Invention

This invention relates to an optical disc device to perform recording onto and reproduction from an optical disc, and in particular relates to an optical pickup in an optical disc device. More specifically, this invention relates to an optical pickup equipped with a plurality of objective lenses, so as to enable recording onto and reproduction from a plurality of types of optical discs having different optical characteristics.

2. Description of the Related Art

Various configurations have been devised for optical pickups for optical disc devices to enable recording and reproduction using a plurality of types of optical discs having different optical characteristics. In particular, due to the appearance of Blu-ray discs, which are high-density recording media, hereafter optical disc devices will be sought which are capable of recording onto and reproduction from blue-light optical discs (HD-DVD and Blue-ray discs) in addition to conventional red-light optical discs (CDs and DVDs).

In order to enable recording onto and reproduction from a plurality of types of optical discs having different optical characteristics using a single optical pickup, a major issue is how to equip the optical pickup with objective lenses. Two methods of resolving this problem are being considered. One method involves equipment with a single objective lens which is compatible with the plurality of types of optical discs having different optical characteristics. The second method involves equipment of a plurality of objective lenses, corresponding to the plurality of types of optical disc.

Next, the thickness of objective lenses corresponding to principal optical discs is explained, referring to FIG. 14. In (A) of FIG. 14, the symbol 101 denotes an objective lens compatible with DVDs and CDs. The thickness Ta of this compatible objective lens 101 is approximately 1.3 mm. The symbol 102 denotes a Blu-ray objective lens compatible with Blu-ray discs. The thickness Tb of this Blu-ray objective lens 102 is approximately 2.5 mm. The symbol 103 denotes a BD/DCD/CD compatible objective lens, which can be used with DVDs, CDs, and Blu-ray discs. The thickness Tc of this BD/DVD/CD compatible objective lens 103 is approximately 4.5 mm. When the objective lens along accounts for this 4.5 mm thickness, considering that the standing mirror is placed directly below the objective lens, there has been the problem that the thickness of the optical pickup becomes larger than the thickness of slim drives (7.3 mm) used in notebook computers, which serve as one yardstick of thinness.

Consequently, from the standpoint of reducing thickness, the second of the above methods (the method of equipping the pickup with a plurality of objective lenses) is regarded as more effective for an optical pickup configuration enabling recording/reproduction of Blu-ray discs, DVDs and CDs.

FIG. 15 is a perspective view showing an actuator for an optical pickup disclosed in Japanese Patent Laid-open No. 2003-281758. The actuator 100 is a two-axis driving device in which objective lenses 112 and 113, corresponding to optical discs with different optical characteristics, are mounted on a single movable member 111, and the movable member 111 can be driven independently in the focusing direction F and in the radial direction R. Such an actuator 100 can be applied to an optical pickup for recording onto/reproduction from a plurality of optical discs with different optical characteristics.

The actuator 100 of Japanese Patent Laid-open No. 2003-281758 is structured with the movable member 111 supported by a base 130 via a holder 114. Two objective lenses, 112 and 113, are mounted on the movable member 111, arranged in the radial direction R. The actuator 100 comprises a support member 115, connecting the movable member 111 to the holder 114, and which supports the movable member 111 moveably in the focusing direction F and in the radial direction R; first magnetic circuits 150, to move the movable member 111 in the focusing direction F; and second magnetic circuits 160, to move the movable member 111 in the radial direction R.

As the manner of arrangement of the objective lenses 112 and 113, in consideration of the fact that the data recording/reproduction region of a high-density optical disc is positioned on the inner side compared with the data recording/reproduction region of a low-density optical disc, the objective lens denoted by the symbol 112 is placed so as to be positioned on the inner side of the optical disc, as the lens for use with high-density optical discs.

Two sets of each of the first and second magnetic circuits 150 and 160 are positioned so as to surround on two sides the objective lenses 112, 113 along the tangential direction (in the direction along the circumference) T of the optical disc. Each set of the first magnetic circuits 150 comprises a focusing magnet 151 and a focusing coil 152; each set of the second magnetic circuits 160 comprises a tracking magnet 161 and a tracking coil 162. The focusing magnets 151 and tracking magnets 161 are permanent magnets; the focusing magnets 151 are provided further to the outside of the movable member 111 than the tracking magnets 161. The focusing coils 152 are provided between the movable member 111 and the focusing magnets 151; the tracking coils 162 are provided between the movable member 111 and the tracking magnets 161.

An optical pickup which uses such an actuator 100 must necessarily be configured as shown in FIG. 16. That is, below the actuator 100 are positioned a light source 140, which emits laser light L; a collimator lens 141; a standing mirror 135 to guide the laser light L to the objective lenses 112, 113; and a photodetector 143 to detect, for the laser light L reflected by and returning from the optical disc outside the drawing, the quantity of light and similar. Between the light source 140 and the standing mirror 135 is provided a half-mirror 142 to transmit laser light L from the light source 140 to the standing mirror 135 and to guide laser light L which has been reflected by and returns from the optical disc to the photodetector 143.

Laser light L emitted from the laser light source 140 passes through the half-mirror 142, is guided by the standing mirror 135 to one of the objective lenses 112 or 113, and irradiates the recording surface of the optical disc, held by the disc rotation mechanism. Laser light L reflected by the recording surface of the optical disc passes through an objective lens 112 or 113 and is reflected by the standing mirror 135, and is guided via the half-mirror 142 to the photodetector 143.

In an optical pickup using the above-described actuator of Japanese Patent Laid-open No. 2003-281758, as shown in FIG. 16, a standing mirror must necessarily be positioned below the actuator, so that in order to achieve a thin shape, the magnetic circuits, standing mirror, and other components must be made compact.

However, there are the problems that, when magnetic circuits are made compact the driving performance in the focusing direction or the radial direction declines, power consumption increases, and the tracking precision declines, so that there are difficulties attending a compact design for magnetic circuits.

Further, the size of the standing mirror depends on the effective diameter of the objective lenses; as optical design conditions, the width of the laser light beam reflected by the standing mirror must be larger than the effective diameter of the objective lens, so that reduction of the size of the standing mirror and a thin design are extremely difficult to achieve.

SUMMARY OF THE INVENTION

The present invention has been proposed in light of the above-described circumstances. An object of the invention is to provide an optical pickup which can easily be made compact and thin, without detracting from the electromagnetic performance or optical performance.

According to a first aspect of the present invention, there is provided an optical pickup for driving objective lenses in a focusing direction and in a radial direction. The pickup of the present invention comprises: a movable member including a center portion, a first side and a second side, the first side and the second side being apart from each other in the radial direction so as to flank the center portion; a plurality of objective lenses provided at the center portion of the movable member; a first coil block and a second coil block provided at the first side and the second side of the movable member, respectively; a first pair of magnets flanking the first coil block in a tangential direction perpendicular to both the focusing direction and the radial direction; a second pair of magnets flanking the second coil block in the tangential direction; a plurality of support members attached to the first side and the second side of the movable member in a manner such that the movable member is movable in the focusing direction and the radial direction; and a reflector facing the center portion of the movable member. Further, each of the coil blocks comprises a focusing coil and a tracking coil. The focusing coil has a coil axis extending in the focusing direction and is provided for driving the movable member in the focusing direction, while the tracking coil has a coil axis extending in the tangential direction and is provided for driving the movable member in the radial direction. The tracking coil is provided on an outer side of the focusing coil. The center portion of the movable member is thinner than the first side and the second side of the movable member.

Preferably, each of the coil blocks may further comprise a tangential tilt coil and a radial tilt coil. The tangential tilt coil is provided for tilting the movable member about an axis extending in the radial direction, while the radial tilt coil is provided for tilting the movable member about an axis extending in the tangential direction.

Preferably, the tangential tilt coil may have a coil axis extending in the focusing direction and be provided adjacent to an open end of the focusing coil. The radial tilt coil may have a coil axis extending in the focusing direction and be provided adjacent to the other (or another) open end of the focusing coil.

Preferably, each pair of the magnets may be arranged in a manner such that the paired magnets have opposite magnetic poles in the tangential direction.

Preferably, the plurality of objective lenses may be arranged side by side in the tangential direction.

Preferably, the reflector may comprise a plurality of standing mirrors corresponding to the plurality of objective lenses, respectively. The standing mirrors are provided between the first coil block and the second coil block so that a laser beam propagating in the tangential direction is reflected toward the corresponding objective lenses.

Preferably, the optical pickup of the present invention may further comprise a holder for supporting the movable member in a cantilever manner via the plurality of support members. The holder is formed with a light-guiding passage for allowing the laser beam to propagate in the tangential direction toward the standing mirrors.

According to a second aspect of the present invention, there is provided an optical disc devise incorporating the above-described optical pickup.

According to the present invention, it is possible to provide a compact optical pickup that comprises the above-mentioned components (a movable member, a plurality of objective lenses, etc.) without impairing their proper functions. In particular, the center portion of the movable member is made thinner than the sides flanking the center portion. Thus, the reflector (standing mirrors), facing the center portion, can be arranged very close to the center portion of the movable member, which contributes to reduction in thickness of the optical pickup.

Other aspects of the present invention and their advantages will be explained in the following with reference to the accompanying drawings.

DETAILED DESCRIPTION OF THE PREFERRED EMBODIMENTS

FIG. 1 through FIG. 5 show a first aspect of an optical pickup of the invention. The optical pickup A1 of this aspect is equipped with two types of lens, corresponding to a plurality of optical discs (for example, Blu-ray discs, DVDs, and CDs) with different optical characteristics, and are used for optical recording onto and reproduction from the optical discs. In each of the diagrams, the side on which optical discs are positioned in the optical pickup A1 is considered as the upper side, the vertical direction is the focusing direction F, the direction along the radius of the optical disc is the radial direction R, and the third direction along the circumference of the optical disc, which is perpendicular to both the focusing direction F and the radial direction R, is the tangential direction T.

Figure 1:
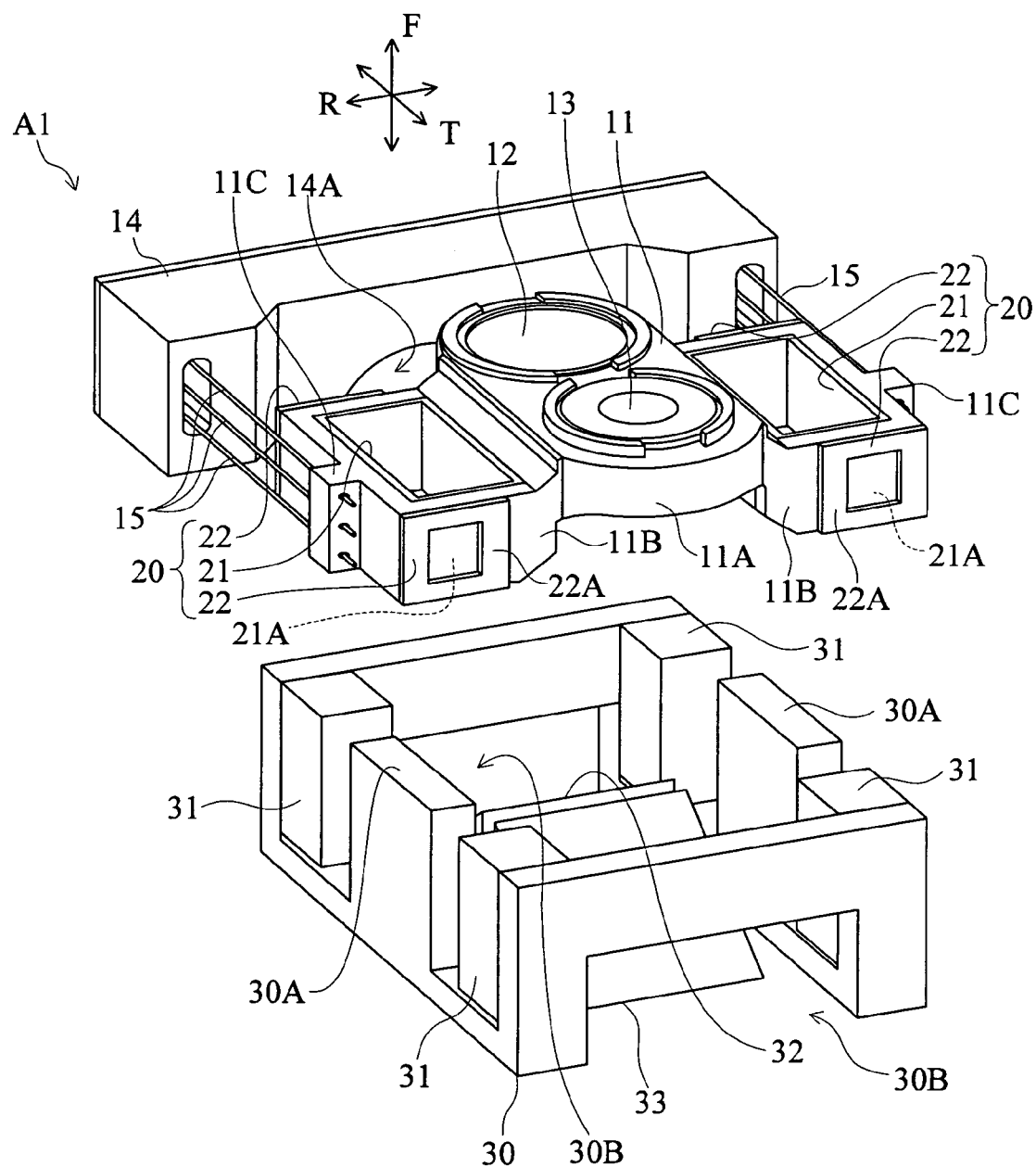
FIG. 1 is an exploded perspective view showing an optical pickup according to a first embodiment of the invention.
Figure 2:
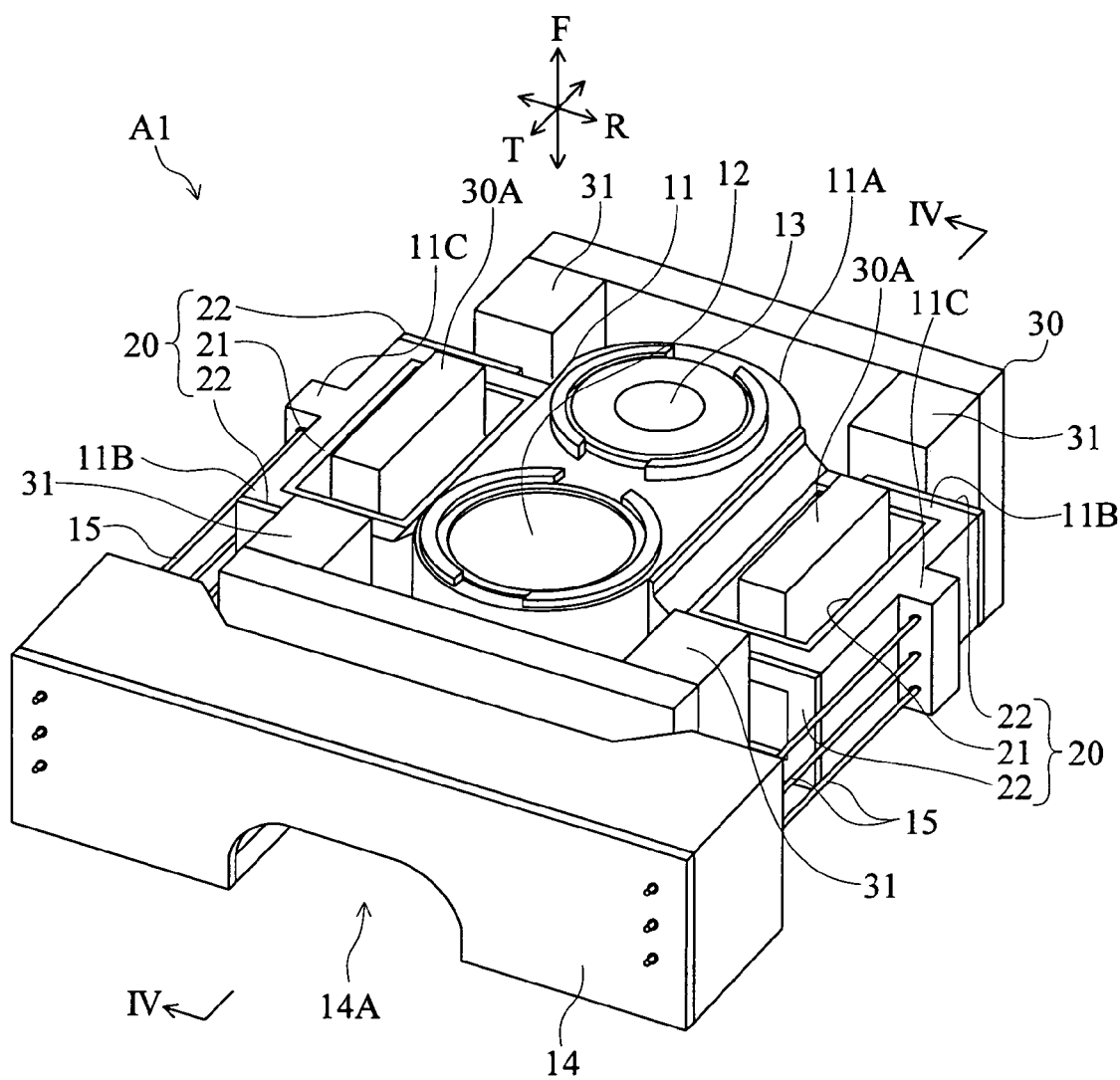
FIG. 2 is an overall perspective view of the optical pickup shown in FIG. 1.

As shown in FIG. 1 and FIG. 2, the optical pickup A1 has a movable member 11; two objective lenses 12 and 13; a holder 14; a plurality of support wires 15; two coil blocks 20, forming a pair; a base 30; two sets of magnets 31, each set having two magnets; and two standing mirrors 32 and 33. One coil block 20 comprises one focusing coil 21 and two tracking coils 22. The movable member 11, objective lenses 12 and 13, holder 14, support wires 15, and coil blocks 20 are configured as an upper assembly; the base 30, magnets 31, and standing mirrors 32 and 33 are configured as a lower assembly. The upper assembly and the lower assembly are unified by fastening of the holder 14 and the base 30 to a separate substrate (not shown) or similar.

The movable member 11 has a center portion 11A, in which are mounted the objective lenses 12 and 13, and side portions 11B, extending on both sides in the radial direction R from the center portion 11A, and comprising the coil blocks 20. The center portion 11A is thinner than the side portions 11B, and is formed on the upper side than the side portions 11B. In this center portion 11A are positioned the two objective lenses 12 and 13, arranged side by side in the tangential direction T. The side portions 11B have a space which penetrates in the focusing direction F; a portion 30A of the base 30 (hereafter called the "core portion") is inserted, as a magnetic core, in this space. A focusing coil 21 is formed on the entire inner wall surface of the side portions 11B, and tracking coils 22 are formed on the outer walls on both sides, facing the tangential direction T. Protruding portions 11C are formed on the outside portions of the side portions 11B facing the radial direction R; to these protruding portions 11C are connected the tips of support wires 15 extending in the tangential direction T. The base ends of the support wires 15 are fastened to both end portions of the holder 14. By this means, the movable member 11 can move in the focusing direction F and in the radial direction R, but cannot move in the tangential direction T, to configure a so-called two-axis driving system.

One of the objective lenses 12 is used for recording onto and reproduction from, for example, a first optical disc, and passes laser light in the focusing direction F to focus the light on the first optical disc. The other objective lens 13 also passes laser light in the focusing direction, but this objective lens 13 is used for recording onto and reproduction from a second optical disc with optical characteristics different from those of the first optical disc, and focuses laser light at a wavelength different from that of the case of the first optical disc onto the second optical disc. These first and second optical discs generally have different optical characteristic specifications, such as recording density and thickness dimensions; specifically, the disc types may be CDs, DVDs, HD-DVDs, or Blu-ray discs. In this aspect, one of the objective lenses 12 corresponds to CDs and DVDs, and the other objective lens 13 corresponds to Blu-ray discs. It is desirable that one of the objective lenses be positioned such that a the straight line along the disc diameter coincides with a radius of the optical disc.

The holder 14 is of substantially the same thickness as the base 30, and is formed to be somewhat larger in the radial direction R than the base 30. On both ends of the holder 14 extending in the radial direction R are fastened base ends of support wires 15. This holder 14 is installed so as to be laterally adjacent to the base 30, with a prescribed interval therebetween in the tangential direction T; the movable member 11 is positioned so as to be superposed on the base 30 with an attitude held in the manner of a cantilever via the support wires 15. Consequently in the bottom portion of the holder 14 is provided a light-guiding hole or passage 14A to enable the unmodified propagation, to below the movable member 11, of laser light propagating in the tangential direction T from a light source, not shown.

Figure 3:
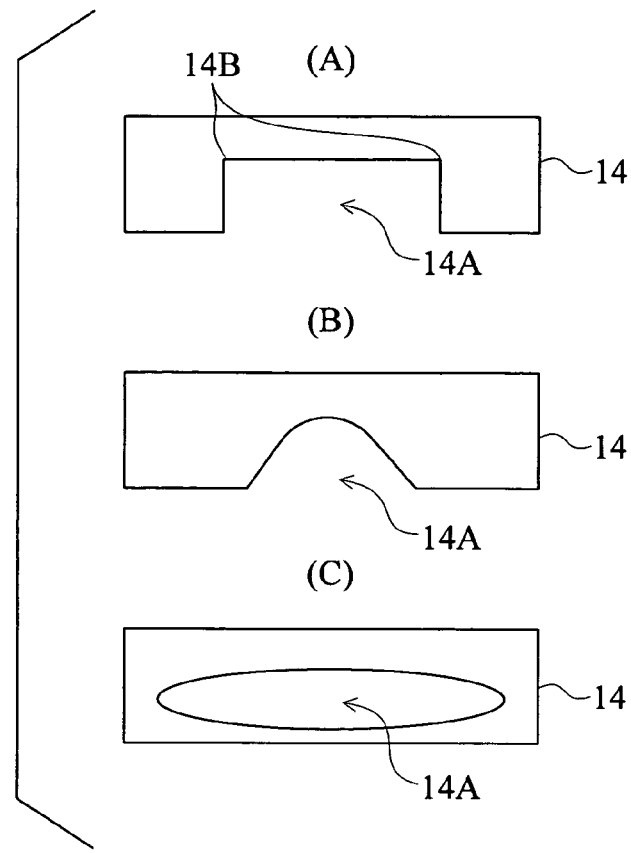
FIG. 3 is a front view showing a partially modified example of the optical pickup shown in FIG. 1.

As other examples of a light-guiding hole or passage 14A, various aperture shapes can be adopted, as shown in (A) through (C) in FIG. 3; the size need only be sufficiently large to enable laser light to be incident on the standing mirror 32 even when there is some installation error when assembling the optical pickup A1. As the aperture shape for the light-guiding hole 14A, when taking performance and manufacturing cost into consideration, the shape shown in (A) of FIG. 3 is most preferable; but a rounded shape, may also be used in which the corner portions 14B are gradually rounded, as shown in FIG. 2.

As stated above, the support wires 15 support the movable member 11 in the manner of a cantilever; a plurality of support wires 15 are provided on one side portion 11B of the movable member 11. These support wires 15 function as conducting wires to provide electricity to the focusing coils 21 and tracking coils 22. The support wires 15 are provided in a number necessary to drive the focusing coils 21 and tracking coils 22 on one side portion 11B of the movable member 11; in FIG. 1 and FIG. 2, three support wires 15 are shown on one side, but three or more support wires may be provided.

The focusing coils 21 have an attitude such that the coil axis is extended in the focusing direction F, and are provided integrally on the side portions 11B of the movable member 11. The tracking coils 22 have an attitude such that the coil axis is extended in the tangential direction T, and are provided integrally on the side portions 11B of the movable member 11, positioned on the outsides of both focus coils 21. The focusing coils 21 are configured such that the electrically conducting portions 21A in the position overlapping the tracking coils 22 are readily affected by the action of the magnetic field due to the magnets 31, and the tracking coils 22 are configured such that, among the parallel electrically conducting portions through which current flows in opposite directions in the focusing direction F, one of the electrically conducting portions 22A is readily affected by the magnetic field of the magnets 31. Hence by causing a perpendicular magnetic field to act on the electrically conducting portions 21A of the focusing coils 21, the movable member 11 is caused to move in the focusing direction F; and independently of this, by causing a perpendicular magnetic field to act on the electrically conducting portions 22A of the tracking coils 22, the movable member 11 is caused to move in the radial direction R.

The magnets 31 are fastened to the base 30 at positions enclosing the core portions 30A on two sides in the tangential direction T, the standing mirrors 32 and 33 are fastened to the bottom-end portion, and the base has a shape enabling placement of the movable member 11 between the core portions 30A and magnets 31 and above the standing mirrors 32 and 33. Cutout portions 30B to enable propagation of laser light propagating along the tangential direction T from a light source, not shown, unmodified to the standing mirrors 32 and 33, are provided in the lower portion of the base 30. Similarly to the light-guiding hole 14A, the cutout portions 30B can adopt various aperture shapes, as shown in (A) through (C) in FIG. 3.

The magnets 31 are fastened substantially in the four corners of the base 30; two opposing magnets, enclosing a magnetic core portion 30A in two sides in the tangential direction T, form a single set. The magnets 31 forming one set are positioned such that the directions of the magnetic poles are in opposite directions in the tangential direction T; specifically, for example, all the magnets 31 are positioned such that the N pole is directed toward the magnetic core portion 30A. By this means, when two focusing coils 21 are driven such that the direction of current about the axis in the focusing direction F is the same, an electromagnetic force acts in the same direction on the electrically conducting portions 21A of each of the focusing coils 21, and the entire movable member 11 is made to move in the focusing direction F. The displacement at this time is controlled by adjusting the driving currents in the focusing coils 21. And, if the tracking coils 22 are driven such that the directions of the currents in the electrical conduction portions 22A of all the tracking coils 22 are the same as seen from the corresponding magnets 31, then an electromagnetic force with the same direction acts on the electrical conduction portions 22A, so that the entire movable member 11 is moved in the radial direction R. The displacement at this time is controlled by adjusting the driving currents in the tracking coils 22. That is, the focusing coils 21 and magnets 31 function as magnetic circuits for focusing control, and the tracking coils 22 and magnets 31 function as magnetic circuits for tracking control. Each of the magnets 31 is used in common for focusing control and for tracking control. The magnetic circuits, combined with the movable member 11, holder 14, support wires 15, and base 30 form an actuator. By means of this configuration, the optical pickup A1, provided with the necessary and sufficient electromagnetic functions, can be made thin and compact.

The standing mirrors 32 and 33 are embedded into the interior of and fastened to the base 30, and arranged to face the center portion 11A of the movable member 11 with the reflecting surfaces tilted toward the respective corresponding objective lenses 11 and 12. Each of the standing mirrors 32 and 33 is positioned opposing the light-guiding hole 14A of the holder 14 and a cutout portion 30B of the base 30 in the tangential direction T. One of the standing mirrors 32 is positioned so as to reflect upward laser light which has propagated in one direction along the tangential direction T, to guide the laser light to the objective lens 12. The other standing mirror 33 is positioned such that the reflecting surface is directed opposite the reflecting surface of the standing mirror 32, so as to reflect upward laser light which has propagated in the direction opposite the former laser light along the tangential direction T, to guide the laser light to the objective lens 13. These standing mirrors 32 and 33 intervene at least partially between the two side portions 11B of the movable member 11, that is, between the pair of coil blocks 20, and to the extent that the center portion 11A of the movable member 11 is positioned higher than the two side portions 11B, the standing mirrors 32 and 33 are positioned as closely as possible to the center portion 11A of the movable member 11. By this means, the thickness of the optical pickup A1 is stipulated by the thickness of the holder 14 and base 30, and the standing mirrors 32 and 33 do not increase the thickness of the optical pickup A1. As a result the standing mirrors 32 and 33 are of a size necessary and sufficient, as a condition of optical design, for the width of the laser light beam to be larger than the effective diameters of the objective lenses 12 and 13, so that a compact and thin optical pickup A1 with the desired optical performance can be realized. In this aspect, two standing mirrors 32 and 33 are placed back-to-back; but a single standing mirror may be used, integrally formed with two reflecting surfaces facing in opposite directions.

Figure 4:
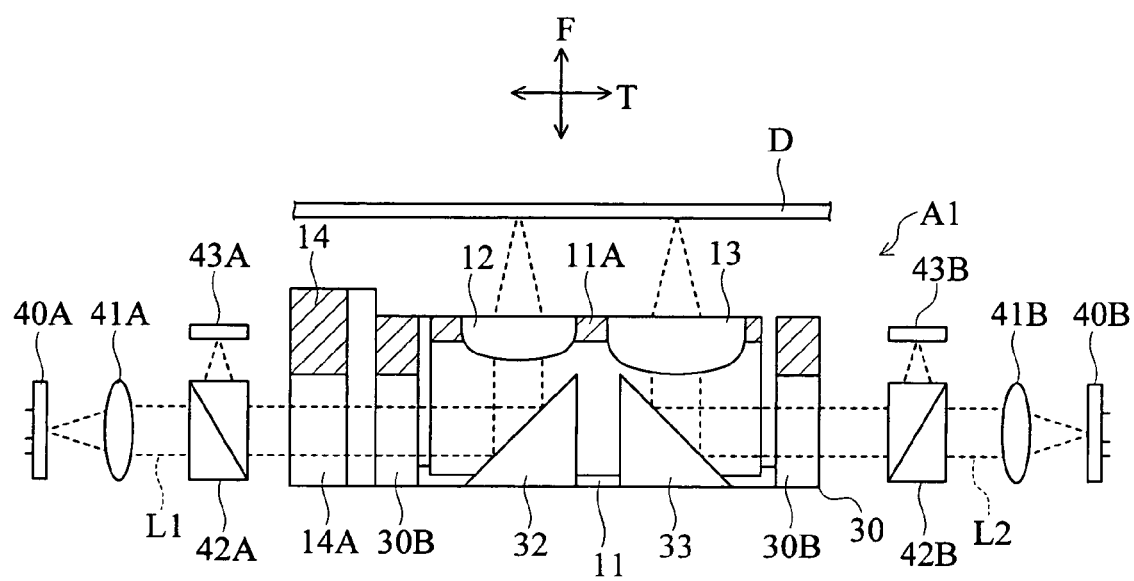
FIG. 4 is a cross-sectional view taken along line IV-IV in FIG. 2.

As shown in FIG. 4, the optical pickup A1 is incorporated into the optical disc device (not shown) together with such other optical components as laser light sources 40A and 40B, collimator lenses 41A and 41B, beam splitters 42A and 42B, and photodetectors 43A and 43B. The optical disc D is placed, supported by a spindle shaft (not shown) along the focusing direction F, such that the recording surface is opposed to the optical pickup A1, and during recording and reproduction the optical disc D is rotated at high velocity about the spindle shaft. In FIG. 4, the radial direction R, not shown, is in the direction perpendicular to the plane of the paper. The optical disc device also comprises optical components to cause the laser light to be incident more efficiently on the objective lenses 12 and 13, or to efficiently guide light reflected from the optical disc D to the photodetectors 43A and 43B; these components are likewise not shown.

When for example the laser light source 40A positioned on the left side in the tangential direction T in FIG. 4 emits laser light L1, this laser light L1 propagates to the right in the tangential direction T and passes through the collimator lens 41A and beam splitter 42A, passes through the light-guiding hole 14A on the left side in the holder 14 and base 30 and through a cutout portion 30B, and is incident without modification on the left-side standing mirror 32. The laser light L1 is reflected upward in the focusing direction F by the reflecting surface of the standing mirror 32, and finally passes through the objective lens 12 and irradiates the optical disc D. On the other hand, when the laser light source 40B positioned on the right side in the tangential direction T emits laser light L2, this laser light L2 propagates to the left in the tangential direction T, passing through the collimating lens 41B and beam splitter 42B, passing through the light-guiding hole 14A on the right side in the holder 14 and base 30 and through a cutout portion 30B, and is incident without modification oh the standing mirror 33. The laser light L2 is then reflected upwards in the focusing direction F by the reflecting surface of the standing mirror 33, and finally passes through the objective lens 13 and irradiates the recording surface of the optical disc D.

As actual operation, when an optical disc D is loaded into the optical disc device, laser light L1 and L2 is output simultaneously from both the laser light sources 40A and 40B, and the laser light L1 and L2 irradiate the recording surface of the optical disc D, and are reflected at the irradiated positions. The reflected laser light L1 and L2 pass through the respective corresponding objective lenses 12 and 13 in the downward focusing direction F, proceeding in a manner opposite that described above to reach the beam splitters 42A and 42B, are reflected by the beam splitters 42A and 42B, and are guided to the photodetectors 43A and 43B.

At the photodetectors 43A and 43B, the quantities of light, diffraction patterns, and similar of the reflected returning laser light L1 and L2 are detected. Based on output signals from the photodetectors 43A and 43B, a disc discrimination circuit, not shown, judges the type of the optical disc D. When, as the discrimination result, it is judged that the currently loaded optical disc D is not recordable/reproducible, a read error results and the output of laser light from the laser light sources 40A and 40B is halted.

When on the other hand the loaded optical disc D is for example a CD, the optical disc D is judged to be an appropriate CD, and recording onto/reproduction from the optical disc D is performed using the left-hand objective lens 12 and standing mirror 32, as well as only the optical components 40A to 43A on the left side. Similarly, when for example the loaded optical disc D is a Blu-ray disc, the optical disc D is judged to be an appropriate Blu-ray disc, and the right-hand objective lens 13 and standing mirror 33, as well as only the optical components 40B to 43B on the right-hand side, are used to perform recording onto/reproduction from the optical disc D.

In recording onto/reproduction from the optical disc D, focusing error detection processing and tracking error detection processing are performed using the photodetectors 43A and 43B, and when a focusing error is detected, the focusing coils 21 are driven to perform focusing control. When a tracking error is detected, the tracking coils 22 are driven to perform tracking control. This focusing control and tracking control is realized through feedback control.

However, the optical disc D itself has such properties as warping and oscillation during high-speed rotation. Due to such properties of the optical disc D, coma aberration may occur as a result of the tilt angle between the optical axis of the laser light L1 or L2 and the recording surface of the optical disc D, and if such coma aberration occurs frequently, it becomes impossible to secure stable low error rate characteristics during recording or reproduction. For example, in the cases of DVDs and Blu-ray discs, it is generally thought that the tilt angle must be within the range ±0.7°.

In order to satisfy such tilt angle requirements, in this aspect a pair of focusing coils 21 is used in feedback control, to control the tilting about the axis in the tangential direction T (radial tilt servo control) of the objective lenses 12 and 13 (movable member 11). That is, the focusing coils 21 and magnets 31 are used for radial tilt servo control in addition to focusing control.

Specifically, when performing radial tilt servo control, the photodetectors 43A and 43B detect the radial tilt angle about the axis in the tangential direction T. Based on the detected radial tilt angle, the driving currents in the two focusing coils 21 are controlled such that a difference arises between the magnitudes of the electromagnetic forces at the electrically conducting portions 21A, causing the radial tilt angle to become 0. By this means, the optical axis of the objective lens 12 or 13 is controlled so as to always be perpendicular to the recording surface of the optical disc D, as seen from the tangential direction T. This radial tilt servo control is performed simultaneously with focusing control.

Figure 5:
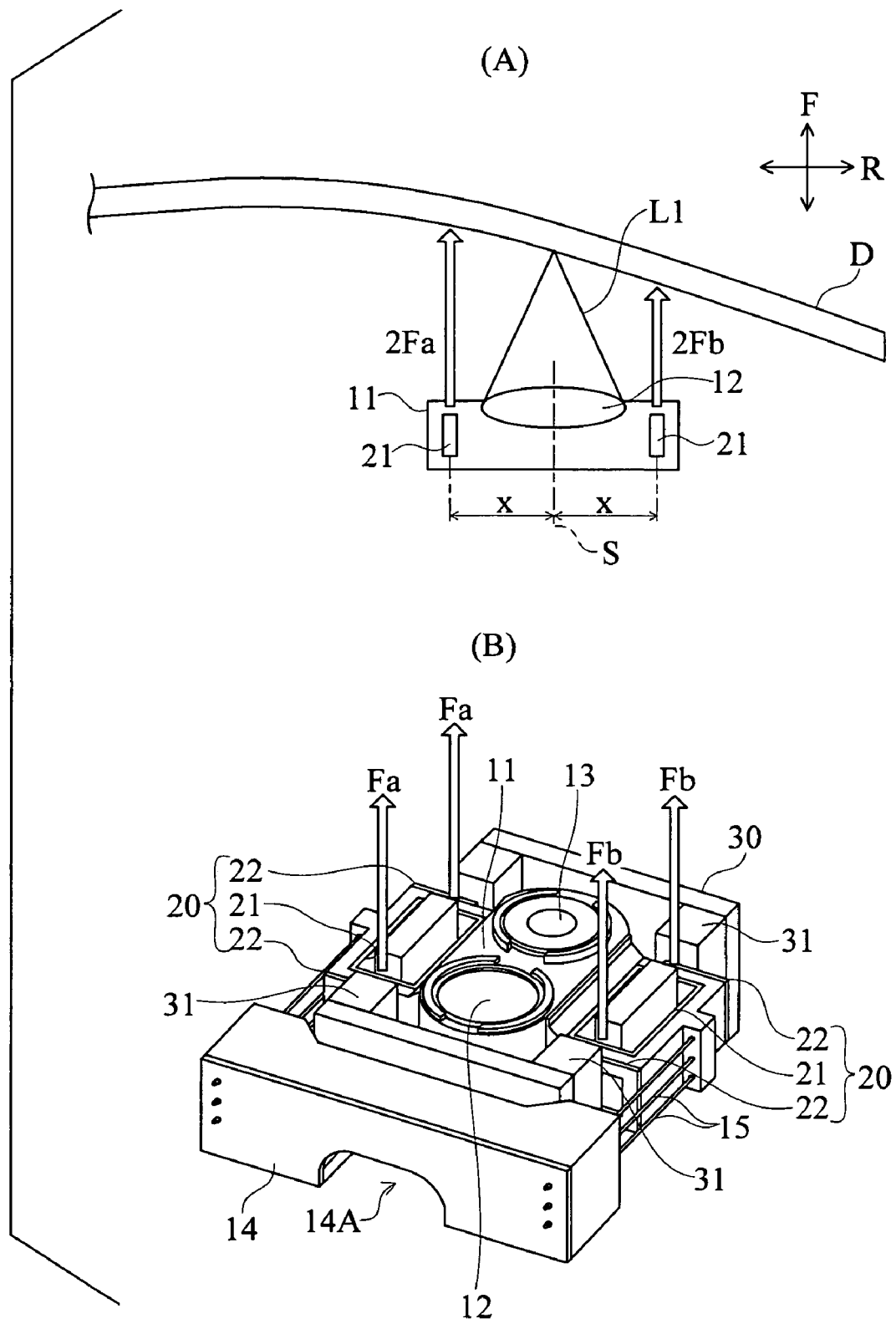
FIG. 5 is a schematic diagram to explain the operation of the optical pickup shown in FIG. 1.

As shown schematically in (A) in FIG. 5, when the optical disc D is warped in the radial direction R, if the force in the focusing direction F necessary for focusing control is F0 and the torque about the axis in the tangential direction T necessary for radial tilt servo control is R0, then driving currents are made to flow in the electrically conducting portions 21A (not shown) of the focusing coils 21 such that the electromagnetic forces Fa and Fb shown in (B) of FIG. 5 occur. That is, for one focusing coil 21 there are two electrically conducting portions 21A which receive the action of electromagnetic induction, and the force F0 in the focusing direction F is the result of summation of the electromagnetic forces Fa and Fb occurring at all the electrically conducting portions 21A, so that F0=2Fa+2Fb. And because electromagnetic forces 2Fa and 2Fb with different magnitudes occur on either side of the axis S which is the center of rotation of the movable member 11, and the forces act at a distance x from the axis S to the focusing coils 21, the torque R0 about the axis in the tangential direction T is R0=(2Fa−2Fb)×x. Through the action of this force F0 in the focusing direction F0 and torque R0 about the axis in the tangential direction T, the attitudes of the objective lenses 12 and 13 are controlled such that the optical axis is appropriate relative to the recording surface of the optical disc D. The driving currents in the two focusing coils 21 can also be controlled such that the electromagnetic forces are directed in opposite directions. Although not shown in FIG. 5, the tangential direction T is perpendicular to the plane of the paper. In FIG. 5, the extent of warping of the optical disc D and magnitudes of forces (lengths of arrows) are substantially emphasized in order to facilitate understanding.

Hence according to the optical pickup A1 of this aspect, the movable member 11 and the standing mirrors 32 and 33 are combined so as to overlap in the focusing direction F, and when seen in plane-view fashion from the focusing direction F, side portions 11B are positioned on the movable member 11 which integrally comprises coil blocks 20 between magnets 31 positioned at the four corners, so that these components can be positioned compactly, and the overall size and shape of the optical pickup A1 can be kept thin and compact.

Further, while attempting to reduce the size and thickness of the optical pickup A1, the individual components necessary for focusing control and tracking control are designed with sizes sufficient to fully achieve the electromagnetic performance and optical performance required, so that stable and precise control is possible.

Also, in addition to focusing control and tracking control, radial tilt servo control can also be executed, so that still more stable and precise control is possible.

Figure 6:
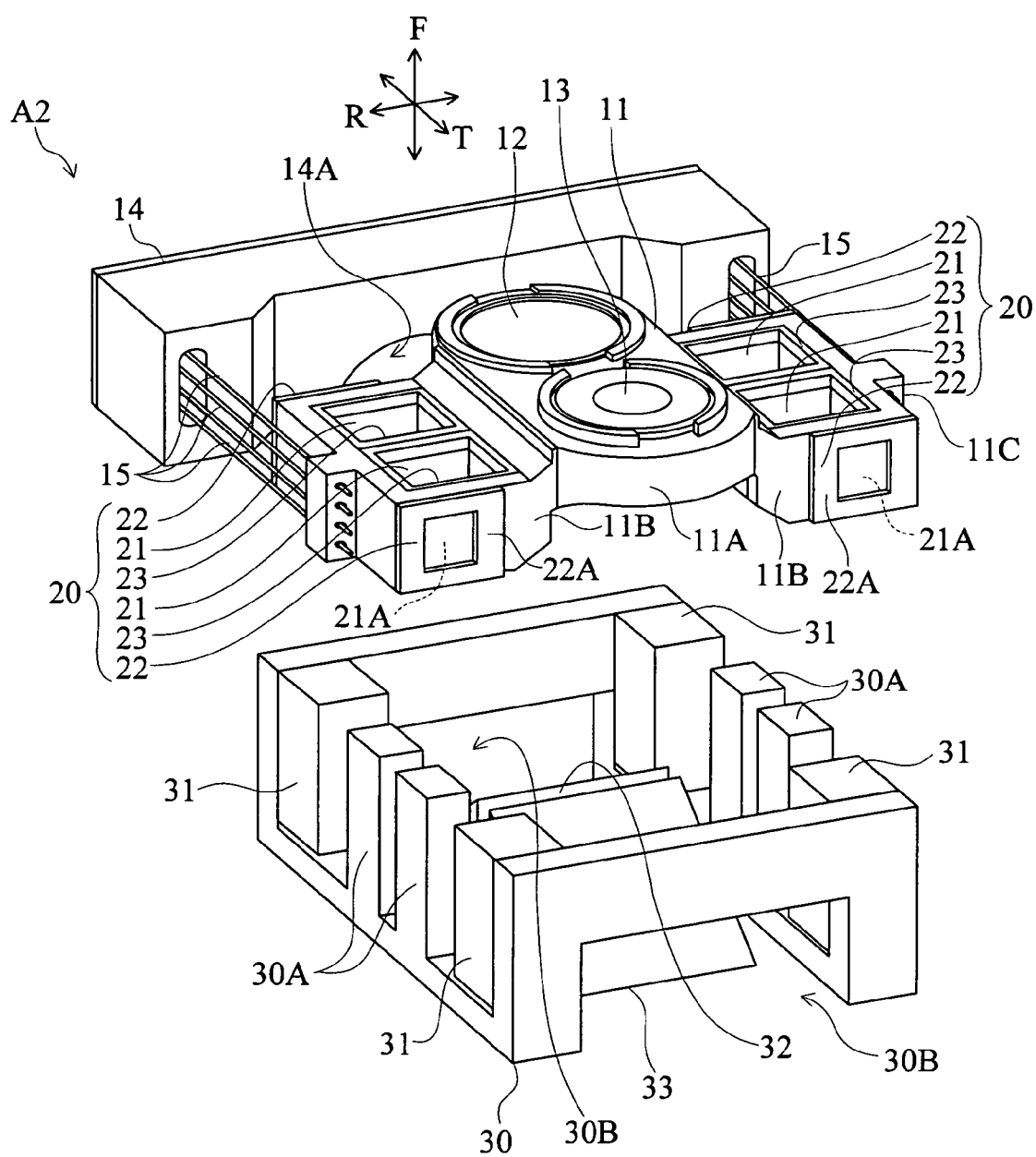
FIG. 6 is an exploded perspective view showing an optical pickup according to a second embodiment of the invention.
Figure 7:
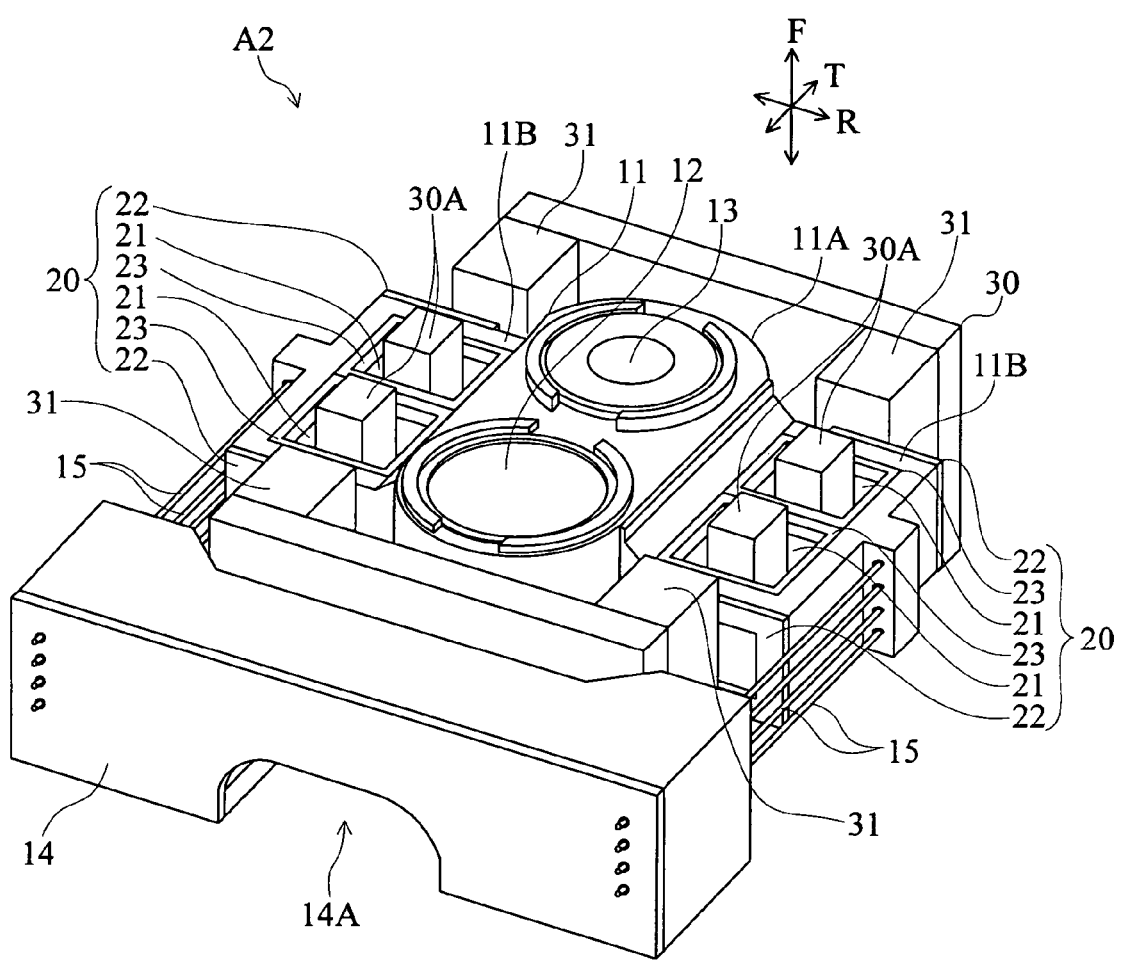
FIG. 7 is an overall perspective view of the optical pickup shown in FIG. 6.
Figure 8:
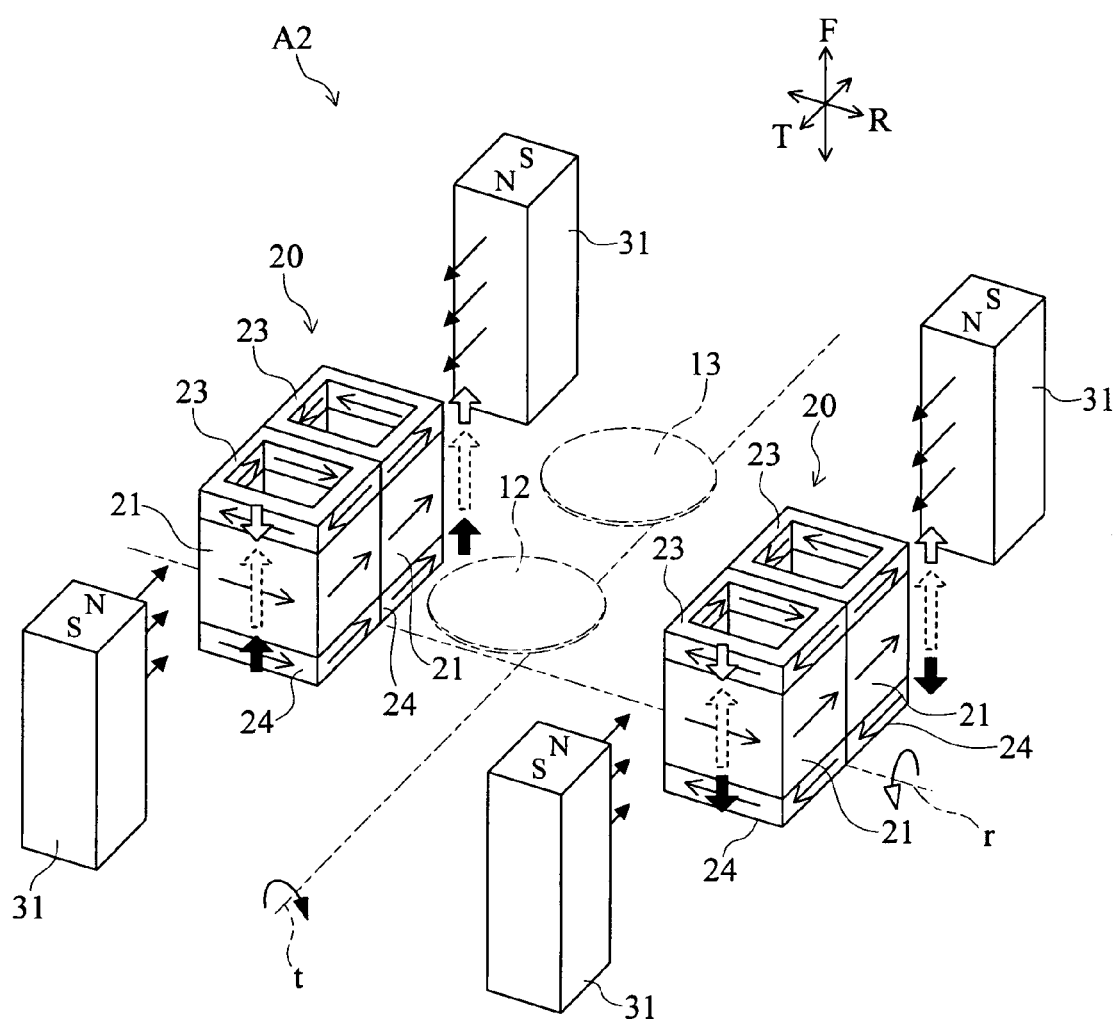
FIG. 8 is a perspective view to explain the operation of the optical pickup shown in FIG. 6.

FIG. 6 through FIG. 8 show a second aspect of an optical pickup. In the following explanation, constituent components which are the same as or similar to those already described are assigned the same symbols, and explanations are omitted.

The optical pickup A2 of this aspect essentially has the same configuration as in the first aspect. A major difference is the configuration of the coil blocks 20. One coil block 20 is configured having two focusing coils 21, two tracking coils 22 (omitted in FIG. 8), two tangential tilt coils 23, and two radial tilt coils 24 (omitted in FIG. 6 and FIG. 7).

Whereas the tracking coils 22 are similar to those in the above-described first aspect, the focusing coils 21 are used only for focusing control, and two focusing coils are provided so as to be adjacent in the circumferential direction C. The tangential tilt coils 23 are used for control (tangential tilt servo control) to control the tangential tilt angle at 0 by tilting the movable member 11 about the axis in the radial direction R; the two coils are provided with an attitude such that the coil axis is extended in the focusing direction F, and adjacent to the open end on the upper side in the focusing direction F of each of the focusing coils 21. The radial tilt coils 24 are used in control (radial tilt servo control) to control the radial tilt angle at 0 by tilting the movable member 11 about the axis in the tangential direction T; the two coils are provided with an attitude such that the coil axis is extended in the focusing direction F, and adjacent to the open end on the lower side in the focusing direction F of each of the focusing coils 21. The support wires 15 are provided, on one side portion 11B of the movable member 11, in a number necessary for driving two focusing coils 21, two tracking coils 22, two tangential tilt coils 23, and two radial tilt coils 24. In FIG. 6 and FIG. 7, four support wires 15 are shown on one side; but five or more support wires may be provided.

As operation, the focusing control and tracking control are similar to those of the above-described first aspect, and are performed using the focusing coils 21 and tracking coils 22. The tangential tilt servo control and radial tilt servo control are performed as follows.

As shown in FIG. 8, for example, two tangential tilt coils 23 on one side are driven by passing currents in opposite directions about the axis in the focusing direction F, and driving the tangential tilt coils 23 in positional relations opposing in the radial direction R so that the current direction is the same. Then, electromagnetic forces appear in opposite directions (see the white-filled arrows) in the two tangential tilt coils 23 positioned on one side as seen from the axis in the radial direction R, and the tangential tilt coils 23 positioned on the other side. As a result, the objective lenses 12 and 13 mounted on the movable member 11 receive a torque and are tilted about the axis r in the radial direction R. The tilt amount in this case is controlled by adjusting the driving currents in the tangential tilt coils 23.

On the other hand, for example the two radial tilt coils 24 on one side are driven such that the direction of current about the axis in the focusing direction F is the same, and moreover radial tilt coils 24 in a positional relation of opposition in the radial direction R are driven such that the direction of current is opposite. By this means, electromagnetic forces arise in opposite directions at the two radial tilt coils 24 positioned on one side as seen from the axis r in the tangential direction T and the two radial tilt coils 24 positioned on the other side (see the black arrows). By this means, the objective lenses 12 and 13 mounted on the movable member 11 feel a torque about the axis t in the tangential direction T, and are tilted. The amount of tilt is controlled by adjusting the driving currents in the radial tilt coils 24. Through such control of the tangential tilt coils 23 and radial tilt coils 24, the optical axes of the objective lenses 12 and 13 are controlled so as to always be perpendicular to the recording surface of the optical disc.

Hence by means of the optical pickup A2 of this invention, advantageous results similar to those of the first aspect can be obtained, and in addition tangential tilt servo control can also be performed independently of the radial tilt servo control, so that precise control can be executed with even greater stability, coma aberration can be eliminated to the extent possible, and stable low error rate characteristics can be secured.

Figure 9:
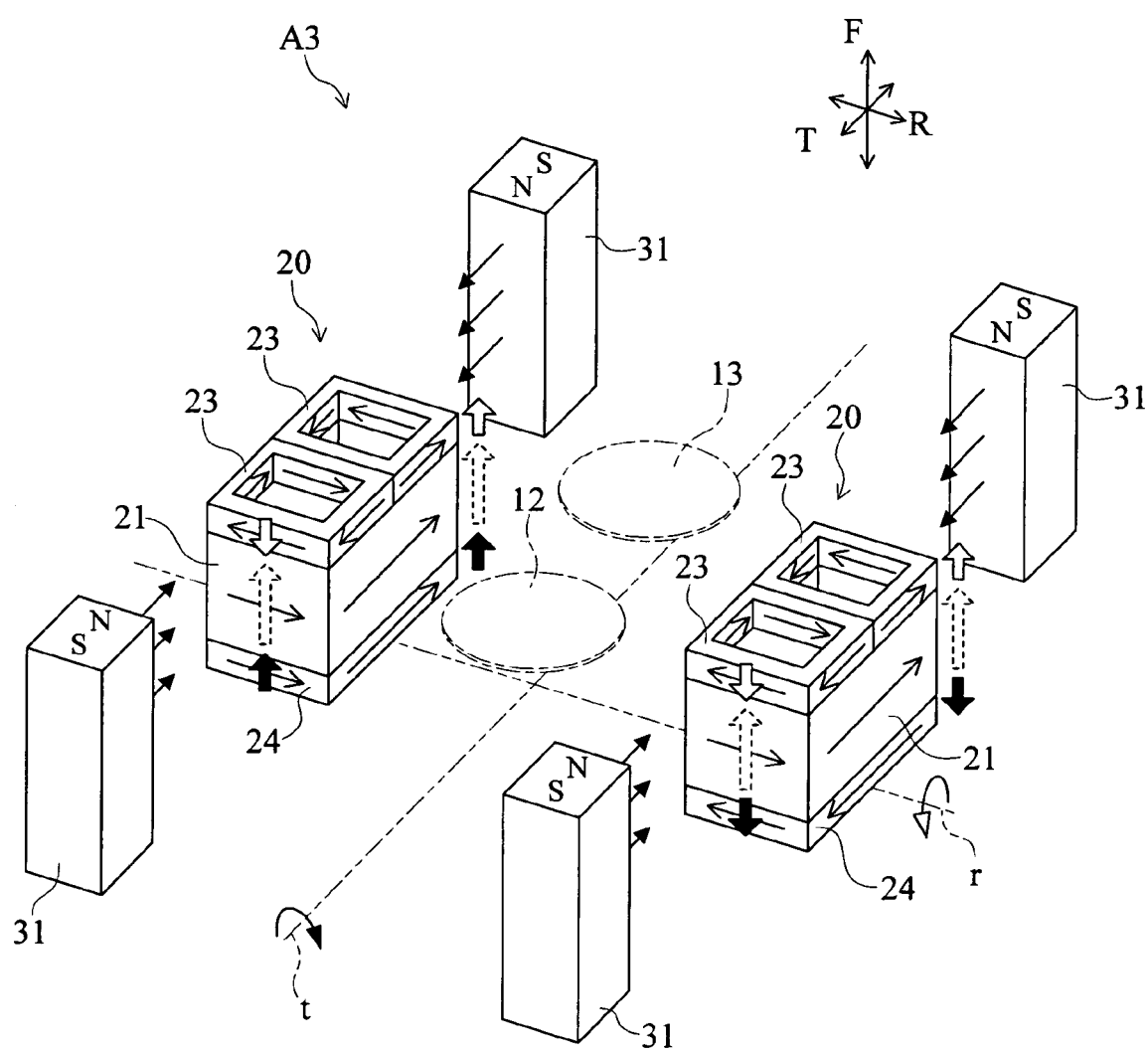
FIG. 9 is a perspective view showing an optical pickup according to a third embodiment of the invention.

FIG. 9 shows a third aspect of an optical pickup. The optical pickup A3 of this aspect has a configuration which is basically similar to that of the second aspect. A difference is the different configuration of the focusing coils 21 and radial tilt coils 24. One coil block 20 is configured having one focusing coil 21, two tracking coils 22 (omitted in FIG. 9), two tangential tilt coils 23, and one radial tilt coil 24.

One focusing coil 21 is provided on each side; two tangential tilt coils 23 are provided on each side, so as to divide the open end on the upper side in the focusing direction F of the focusing coil 21. One radial tilt coil 24 is provided on each side, adjacent to the open end on the lower side in the focusing direction F of the focusing coil 21.

As the action, the focusing control, tracking control, and tangential tilt servo control are similar to those in the second aspect, and the radial tilt servo control is executed as follows.

As shown in FIG. 9, with respect to the radial tilt coils 24 for example, driving is performed such that the current directions are opposite. Then electromagnetic forces arise in opposite directions (see the black arrows) at the radial tilt coil 24 positioned on one side as seen from the axis t in the tangential direction T and the radial tilt coil 24 positioned on the other side. By this means, the objective lenses 12 and 13 mounted on the movable member 11 receive a torque and are tilted about the axis t in the tangential direction T. The amount of tilt at this time can be controlled by adjusting the driving currents in the radial tilt coils 24. This control of the radial tilt coils 24 is similar to that in the second aspect, and the optical axes of the objective lenses 12 and 13 are controlled so as to be always perpendicular to the recording surface of the optical disc.

Hence according to the optical pickup A3 of this aspect, in contrast with the second aspect, only one focusing coil 21 and one radial tilt coil 24 are provided on each side, so that the coil structure can be simplified while achieving the same advantageous results as in the second aspect.

Figure 10:
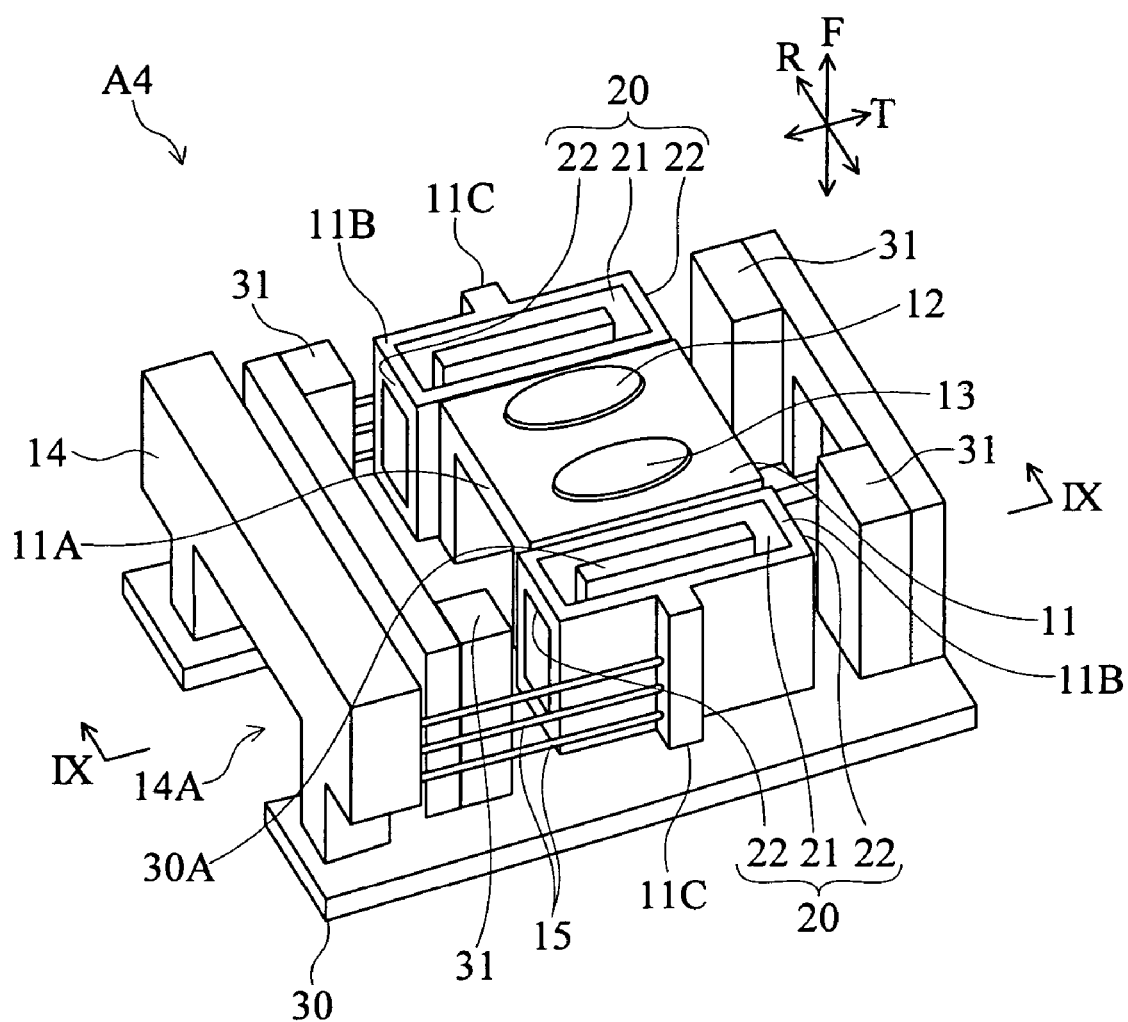
FIG. 10 is a perspective view showing an optical pickup according to a fourth embodiment of the invention.
Figure 11:
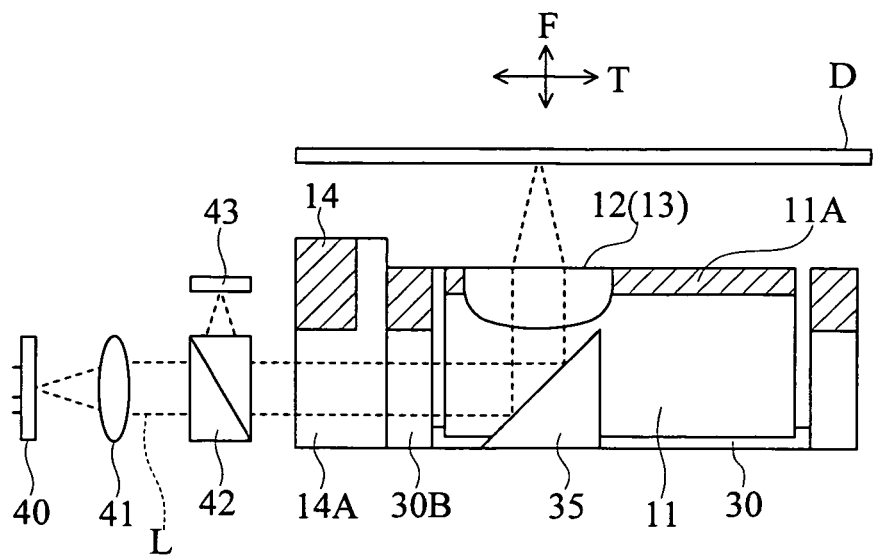
FIG. 11 is a cross-sectional view along line IX-IX in FIG. 10.

FIG. 10 and FIG. 11 show a fourth aspect of an optical pickup. The optical pickup A4 of this aspect has a configuration which is basically similar to that of the first aspect. A difference is the fact that two objective lenses 12 and 13 are mounted on the movable member 11, arranged in the radial direction R. A single standing mirror 35 is provided, so as to correspond to both the objective lenses 12 and 13. This standing mirror 35 is positioned so as to reflect upward the laser light which has propagated from one side in the tangential direction T via the light-guiding hole 14A in the holder 14 and similar, to guide the laser light to both the objective lenses 12 and 13. It is desirable that two optical paths, passing through the objective lenses 12 and 13, be formed in parallel. In essence, a configuration is adopted in which two optical systems, shown in FIG. 4 (laser light source, collimator lens, beam splitter, and similar), are provided, arranged in parallel on only one side in the tangential direction T. Of course a portion of the optical components may be used in common. Or, as shown in FIG. 11, one laser light source 40, collimator lens 41, beam splitter 42, and photodetector 43 may be provided, with these optical components used in common for different types of optical discs D. In this case, it is desirable that a dichroic prism or other device having wavelength selectivity be placed before the standing mirror 35 to switch the optical path. In FIG. 11, an example in which the laser light source 40 and similar are placed on the left side is shown as one example; of course the laser light source and similar may be placed on the right side, with the reflecting surfaces of the standing mirror placed so as to face the laser light source or similar. In this case, there is no need to provide a light-guiding hole in the holder.

Figure 12:
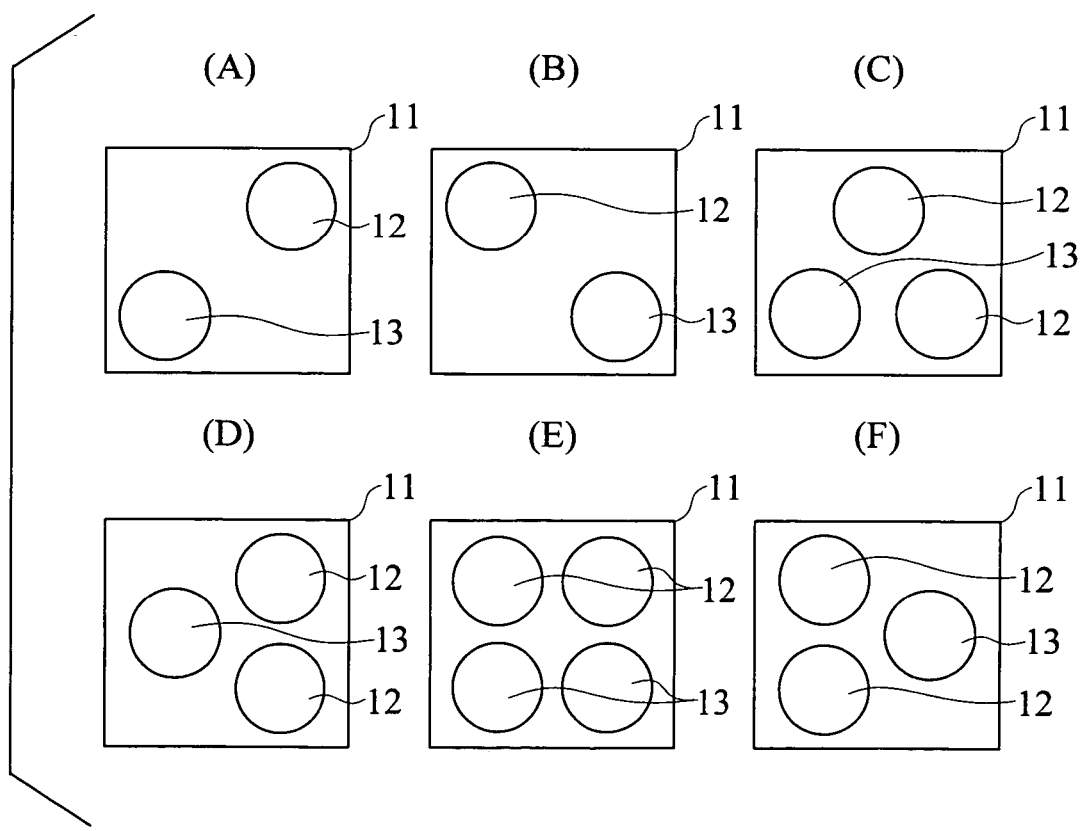
FIG. 12 is a plane view to explain an example of an objective lens mounting pattern.

In addition to the patterns of mounting of the objective lenses 12 and 13 shown in the above first through fourth aspects, mounting patterns such as those of (A) through (F) in FIG. 12 may be used. For example, as shown in (A) and (B) in FIG. 12, two objective lenses 12 and 13 may be placed so as to be arranged in a diagonal direction on the upper face of the movable member 11. Or, as shown in (C) through (F) in FIG. 12, three or four objective lenses 12, 13 can be mounted on the movable member 11, with appropriate intervals therebetween. Whatever the pattern for mounting the objective lenses 12 and 13, so long as positioning such that the movable member 11 and the standing mirror (not shown in FIG. 12) overlap, the optical pickup can be made thin and compact.

Figure 13:
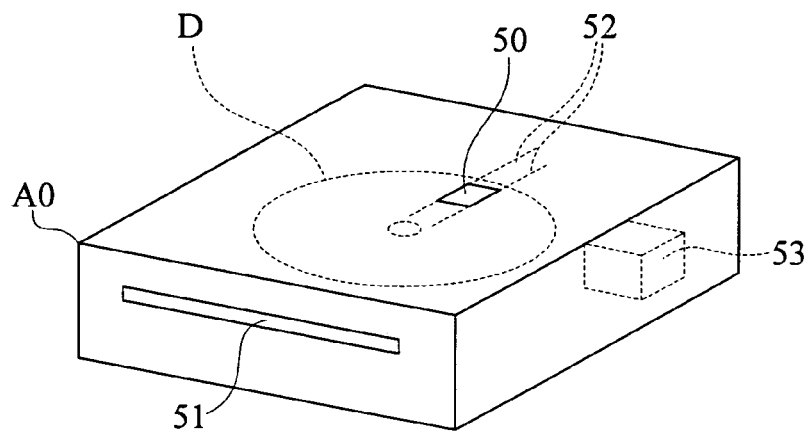
FIG. 13 is a perspective view showing an optical disc device incorporating an optical pickup of the invention.
Figure 14:
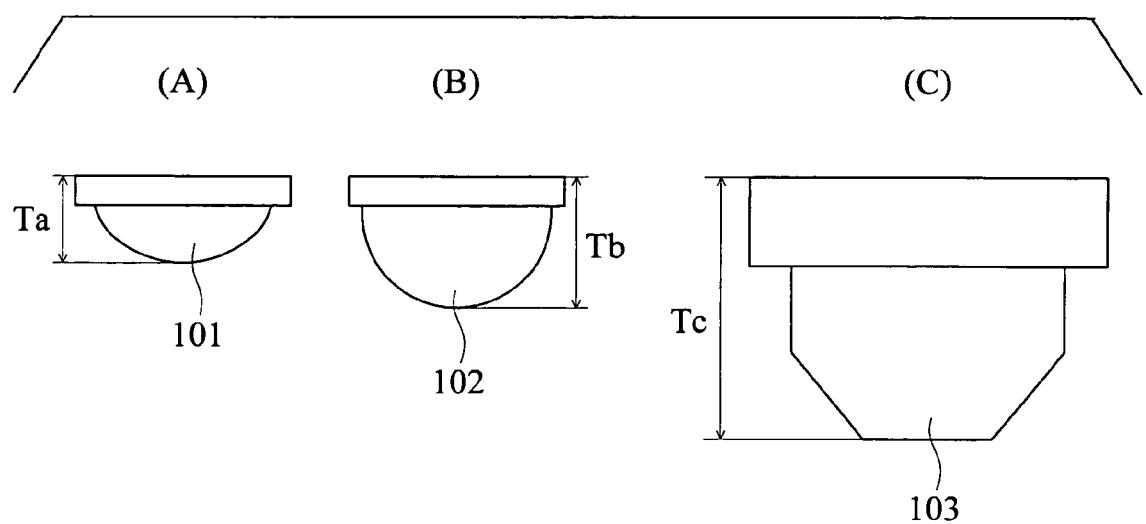
FIG. 14 is an explanatory diagram used to explain the thickness of objective lenses corresponding to various types of optical disc.
Figure 15:
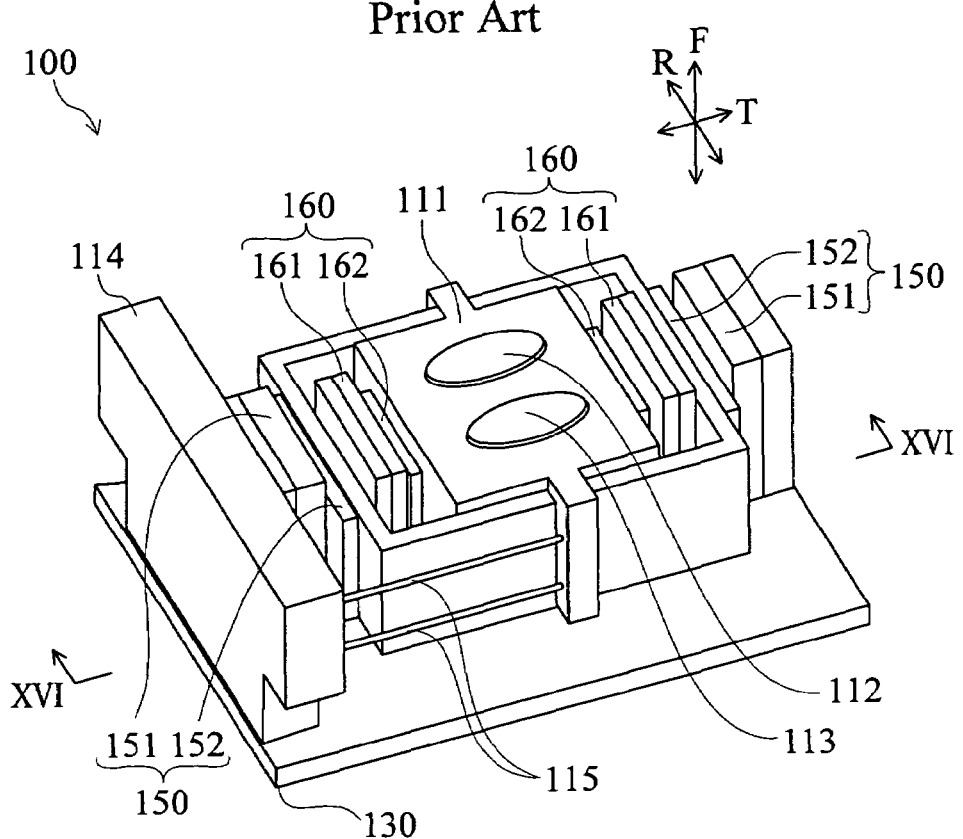
FIG. 15 is a perspective view showing an actuator for an optical pickup of the prior art; and, FIG. 16 is a cross-sectional view taken along line XVI-XVI in FIG. 15.
Figure 16:
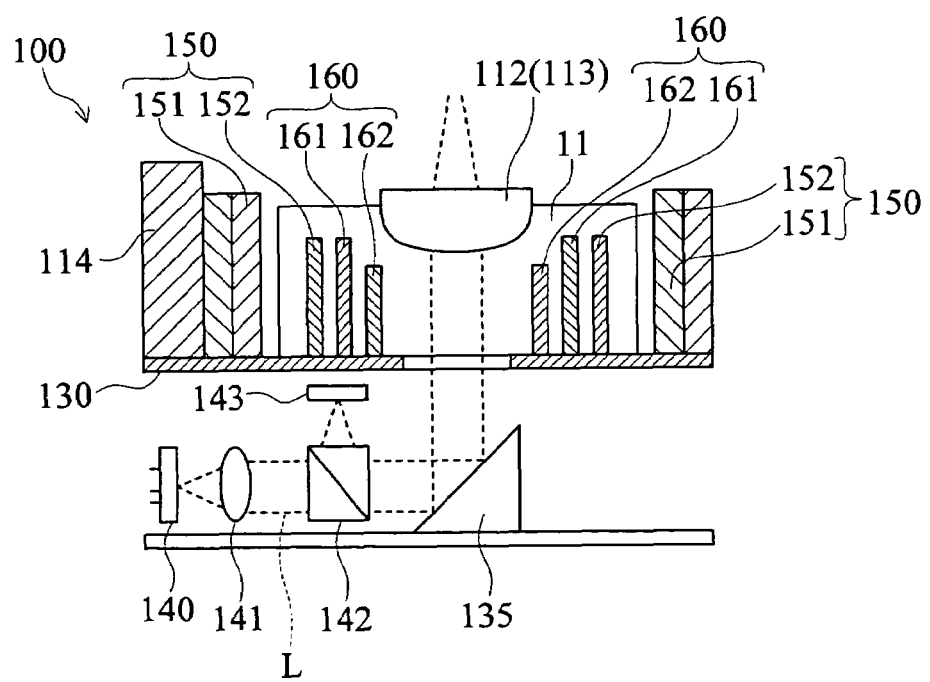

The optical pickups A1 through A4 described in the above first through fourth aspects are mounted on a traverse unit 50, provided within the optical disc device A0 as shown in FIG. 13. The optical disc D is loaded into the optical disc device A0 by inserting from the insertion aperture 51, and this optical disc D is supported on a spindle shaft (not shown). The traverse unit 50 is supported by a pair of rails 52 on the recording-surface side of the optical disc D along a radial direction, and driving means 53 is provided to cause reciprocating motion of the traverse unit 50 in a radial direction of the optical disc D along the rails 52. By adopting in this optical disc device A0 an optical disc pickup A1 to A4 which has been designed to be thin and compact, the entire optical disc device A0 can be made thin and compact.

The invention claimed is:

1. An optical pickup for driving objective lenses in a focusing direction and in a radial direction, the pickup comprising:
a base configured with an interior mounting space and a light-propagating cutout;
a movable member movable relative to the base, the movable member including a center portion, a first side and a second side, the first side and the second side being apart from each other in the radial direction so as to flank the center portion;

a plurality of objective lenses provided at the center portion of the movable member;

a first coil block and a second coil block provided at the first side and the second side of the movable member, respectively;

a first pair of magnets provided on the base and flanking the first coil block in a tangential direction perpendicular to both the focusing direction and the radial direction;

a second pair of magnets provided on the base and flanking the second coil block in the tangential direction;

a plurality of support members attached to the first side and the second side of the movable member in a manner such that the movable member is movable in the focusing direction and the radial direction; relative to the base;

a holder configured with a light guiding opening and connected to the support members holding the movable member via the support members;

a reflector provided in the interior mounting space of the base, facing the center portion of the movable member, and intervening between the first side and second side of the movable member;

wherein each of the coil blocks includes a focusing coil and a tracking coil, the focusing coil having a coil axis extending in the focusing direction and being provided for driving the movable member in the focusing direction, the tracking coil having a coil axis extending in the tangential direction and being provided for driving the movable member in the radial direction, the tracking coil being provided on an outer side of the focusing coil, wherein the center portion of the movable member is thinner than the first side and the second side of the movable member, and wherein the light-guiding opening of the holder is aligned with the light-propagating cutout of the base to allow a light beam to pass through the light-guiding opening of the holder and the light-propagating cutout of the base onto the reflector.

2. The optical pickup according to claim 1, wherein each of the coil blocks further includes a tangential tilt coil and a radial tilt coil, the tangential tilt coil being provided for tilting the movable member about an axis extending in the radial direction, the radial tilt coil being provided for tilting the movable member about an axis extending in the tangential direction.

3. The optical pickup according to claim 2, wherein the tangential tilt coil has a coil axis extending in the focusing direction and is provided adjacent to an open end of the focusing coil, and the radial tilt coil has a coil axis extending in the focusing direction and is provided adjacent to another open end of the focusing coil.

4. The optical pickup according to claim 1, wherein each pair of magnets is arranged in a manner such that the magnets have opposite magnetic poles in the tangential direction.

5. The optical pickup according to claim 1, wherein the plurality of objective lenses are arranged side by side in the tangential direction.

6. The optical pickup according to claim 5, wherein the reflector includes a plurality of standing mirrors corresponding to the plurality of objective lenses, respectively, the standing mirrors being provided between the first coil block and the second coil block so that a laser beam propagating in the tangential direction is reflected toward the corresponding objective lenses.

7. The optical pickup according to claim 6, wherein the holder supports the movable member in a cantilever manner via the plurality of support members, and the light guiding opening allows the laser beam to propagate in the tangential direction toward the standing mirrors.

8. An optical disc devise comprising the optical pickup according to claim 1.

9. An optical pickup for driving an objective lens in a focusing direction and in a radial direction, the pickup comprising:

a base having an interior mounting space and a light-propagating cutout;

a movable member movable relative to the base, the movable member including a center portion, a first side and a second side, the first side and the second side being apart from each other in the radial direction so as to flank the center portion;

an objective lens provided at the center portion of the movable member;

a combination of coils and magnets for driving the movable member in the focusing direction and in the radial direction;

a holder to hold a movable member via a plurality of support wires and configured with a light guiding opening; and a reflector provided in the interior of the mounting space of the base, facing the center portion of the movable member, intervening between the first side and second side of the movable member, wherein the light-guiding opening of the holder is aligned with the light-propagating cutout of the base to allow a light beam to pass through the light-guiding opening of the holder and the light-propagating cutout of the base onto the reflector.

10. An optical pickup for driving objective lenses in a focusing direction and in a radial direction, the pickup comprising:

a movable member including a center portion, a first side and a second side, the first side and the second side being apart from each other in the radial direction so as to flank the center portion;

a plurality of objective lenses provided at the center portion of the movable member;

a first coil block and a second coil block provided at the first side and the second side of the movable member, respectively;

a first pair of magnets flanking the first coil block in a tangential direction perpendicular to both the focusing direction and the radial direction;

a second pair of magnets flanking the second coil block in the tangential direction;

a plurality of support members attached to the first side and the second side of the movable member in a manner such that the movable member is movable in the focusing direction and the radial direction; and a reflector facing the center portion of the movable member;

wherein each of the coil blocks comprises a focusing coil and a tracking coil, the focusing coil having a coil axis extending in the focusing direction and being provided for driving the movable member in the focusing direction, the tracking coil having a coil axis extending in the tangential direction and being provided for driving the movable member in the radial direction, the tracking coil being provided on an outer side of the focusing coil;

wherein the center portion of the movable member is thinner than the first side and the second side of the movable member;

wherein each of the coil blocks further includes a tangential tilt coil and a radial tilt coil, the tangential tilt coil being provided for tilting the movable member about an axis extending in the radial direction, the radial tilt coil being provided for tilting the movable member about an axis extending in the tangential direction; and wherein the tangential tilt coil has a coil axis extending in the focusing direction and is provided adjacent to an open end of the focusing coil, the radial tilt coil having a coil axis extending in the focusing direction and being provided adjacent to another open end of the focusing coil.

* * * * *